United States Patent [19]

Matsumoto et al.

[11] 4,251,603
[45] Feb. 17, 1981

[54] BATTERY ELECTRODE

[75] Inventors: Isao Matsumoto, Osaka; Tsutomu Iwaki, Yawata; Nobuyuki Yanagihara, Hirakata, all of Japan

[73] Assignee: Matsushita Electric Industrial Co., Ltd., Osaka, Japan

[21] Appl. No.: 121,232

[22] Filed: Feb. 13, 1980

[51] Int. Cl.³ .............................................. H01M 4/80
[52] U.S. Cl. .................................... 429/94; 429/235; 428/613; 75/20 F
[58] Field of Search ................... 429/45, 94, 218, 219, 429/234, 235, 236, 233

[56] References Cited

U.S. PATENT DOCUMENTS

| | | | |
|---|---|---|---|
| 2,474,502 | 7/1949 | Suchy | 204/20 |
| 2,694,743 | 11/1954 | Ruskin et al. | 429/234 |
| 2,954,417 | 9/1960 | Lehovec et al. | 429/218 |
| 3,287,166 | 11/1966 | Arrance | 429/219 |
| 3,356,537 | 12/1967 | Duddy | 429/45 |
| 3,597,539 | 8/1971 | Wagner et al. | 29/420.5 |
| 3,704,193 | 11/1972 | Valdo et al. | 75/20 F |

*Primary Examiner*—Donald L. Walton
*Attorney, Agent, or Firm*—Spencer & Kaye

[57] ABSTRACT

A battery electrode comprises a plaque made of a sponge-like porous metal matrix having a multiplicity of cells connected with each other three-dimensionally, wherein the sectional area of the gratings making up the sponge-like metal porous plaque decreases continuously along the thickness of the plaque from the surface toward the central part and an active material is impregnated in the porous plaque.

7 Claims, 7 Drawing Figures

ALONG SHORTER DIAMETER →
ALONG LONGER DIAMETER →
(×50)

BATTERY ELECTRODE

BACKGROUND OF THE INVENTION

1. Field of the Invention

The present invention relates to a battery electrode having a plaque made of a sponge-like porous metal matrix having a multiplicity of cells therein connected with each other three-dimensionally.

2. Description of the Prior Art

Conventional electrodes for the primary battery presently on the market are produced by a method in which a powder mixture mainly comprising an active material is impregnated directly in the battery case or molded with a support such as a grating, a screen, a punched metal or an expanded metal arranged at the central part of the mixture. This production method is simple and has the advantage that a number of active materials are capable of being impregnated, thus making it suitable for the primary battery which does not require a very high strength. Representative secondary batteries include a lead acid battery and a nickel-cadmium storage battery. The electrodes for the lead acid battery are made by a method in which a paste mainly comprising at least an active material is coated with a lead grating or an expanded metal as a support or a method in which a cylinder of metal having numerous minor pores is impregnated with an active material. These methods provide a simple production process since about the only main work involved is the coating of an active material or the impregnation thereof in the cylinder directly. The electrodes of the nickel-cadmium storage battery, on the other hand, are made by a method in which an active material is filled in a sintered plaque of nickel powder or a method in which an active material is directly filled in a metal bag having a multiplicity of small pores. The former method was developed after the World War II and requires a rather complicated process of immersing the electrodes in a salt of the active material to convert the salt into an active material. In spite of this, the electrode made by this method is superior to the electrodes made by the other methods in strength and electrical performances. The latter method is used for making a pocket-plate electrode and simple in view of the fact that the active material powder is filled directly, although the electrical performances of the electrode thus made are inferior to those of the electrode using a sintered plaque.

The conventional methods for producing a battery and electrodes thereof are roughly described above. At the present, earnest efforts are being made to develop a secondary battery, or especially an alkali storage battery (mainly a nickel-cadmium storage battery) having a non-sintered electrode of other than pocket-plate having electrical performances substantially identical to those of a sintered electrode superior in strength and which can be impregnated with an active material at high density by a simple production process. Such methods are disclosed by U.S. Pat. No. 2,474,502 and No. 2,694,743 for a sponge-like porous metal matrix and by U.S. Pat. No. 3,287,164 and No. 3,597,829 for an electrode using such a sponge-like porous metal matrix. This sponge-like porous metal matrix is made by the process as mentioned below.

In one method, a sponge of resin is plated with a metal and after removing the resin, the metal is annealed. According to a second method, a metal powder is filled in a resin sponge and the whole structure is sintered. According to still another method, a mixture of a material acting as a pore-promoting agent and a metal powder is sintered or molten, and any pore-promoting agent that may remain is removed by etching or the like. In a further method, a gas is blown into a molten metal and cooled with bubbles kept therein followed by application of a high pressure thereby to remove the films between the bubbles. The method in which the resin is plated already finds an industrial application. In any way, the sponge-like porous metal matrix has pores which are generally larger in average diameter than the pores of a sintered plaque of a metal powder (about 1 $\mu$m). This average pore diameter is suitable for the grain size of the active material and makes it possible to directly fill it. The sintered substrate, by contrast, has a smaller average pore diameter, so that it is almost impossible to fill the powder directly. Instead, after the plaque is immersed in a salt solution of the active material, it is necessary to convert the salt impregnated in the plaque into an active material, or the plaque must be cathodically polarized in a salt solution to get the active material. This is indicative of the fact that in the case of a sponge-like porous metal matrix, the active material is capable of being filled in the substantially same simple production process as that for a non-sintered electrode. Another feature of the electrode using a plaque of sponge-like porous metal matrix resides in that in view of the fact that the active material is completely covered by a metal grating, a long service life cycle and a high electron conductivity of the electrode results, thus making it suitable for high-rate discharge. Further, the porosity is easily capable of being increased beyond that of the sintered plaque (about 80%), thus increasing the density of the filled active material. In the case of a sponge-like porous metal matrix made by plating, for instance, the porosity of up to a maximum of approximately 98% is possible. In continuous production in industrial applications, however, the porosity of about 96% or less is desirable to maintain the strength of a plaque 1 to 2 mm thick. The sponge-like porous metal matrix which has a porosity about 20% higher than that of the sintered plaque (about 80%) is capable of being filled with a proportionately greater amount of the active material.

The electrode having a plaque made of a sponge-like porous metal matrix mentioned above is superior in various electrical performances as a battery electrode and is capable of being impregnated with an active material of a large volume by a simple process. Therefore, it is suitable for the primary battery requiring a high-rate discharge performance as well as for the secondary battery. It may also be used as a spiral electrode.

As a result of an application of an electrode having a plaque of the sponge-like porous metal matrix having the features mentioned above to a nickel electrode, the advantages mentioned below have been found.

Figure 2:
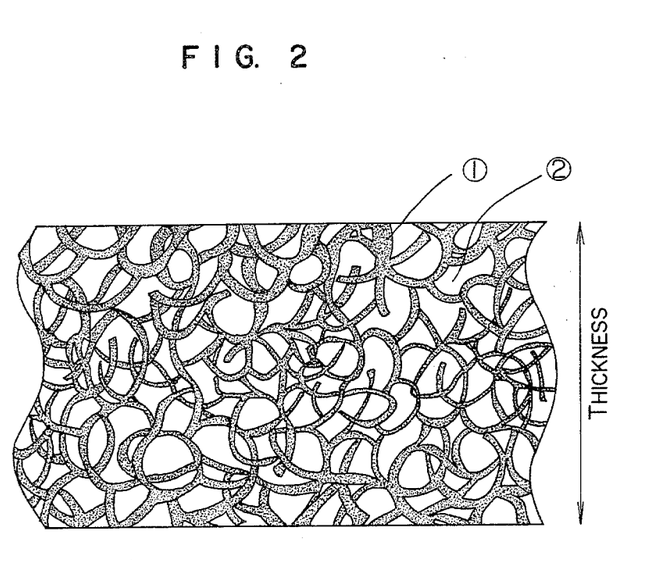
FIG. 2 is a sectional view schematically showing the sponge-like porous metal matrix thinning along the thickness from the surface toward the central part continuously, in which (1) shows metal gratings, and (2) cells.

By plating a resin sponge with nickel, a sponge-like porous metal matrix of substantially uniform grating diameters (average porosity of 95% and number of cells 55 per inch) is obtained. This is used as a plaque which is filled with a paste of a mixture powder mainly comprising hydroxide nickel powder (86% by weight), resulting in the filling density of 300 to 320 mAh/cm$^3$. When pressure of 400 kg/cm$^2$ is applied, the density is improved to 430 to 450 mAh/cm$^3$. Although this is higher than the density of 350 to 400 mAh/cm$^3$ for an ordinary sintered plaque, it has been found that if the sectional area of the grating near the surface of the plaque is increased and that at the central part thereof is decreased by changing the plating conditions such as the current density or agitation for making the sponge-like porous metal matrix, a greater amount of active material is capable of being impregnated regardless of the same porosity of the whole structure and this high density is maintained after pressure work. A sectional view of this sponge-like porous metal matrix is shown schematically in FIG. 2. Specifically, a foamed resin is coated with carbon black uniformly inside and plated on both sides with nickel with substantially no agitation at the current density of 3.0 A/cm$^2$ in Watt solution for five minutes. The resulting structure is washed in water and the resin is removed by roasting, followed by an annealing process in a hydrogen environment at 800° C. for 30 minutes, thus producing a sponge-like nickel porous metal matrix having the average porosity of 96%, the sectional area of the grating near the surface of about 2800 $\mu$m$^2$, that at the central part of about 700 $\mu$m$^2$, and the number of cells of 55 per inch. This porous sheet is pressurized between rollers, so that the surface thereof is flattened and the porosity thereof is controlled at 95%. This is used as a plaque which is filled with a paste of a powder mixture containing 86% by weight of hydroxide nickel of average grain size of 25 to 150 $\mu$m. This structure is dried and subjected to pressure between flat plates at 400 kg/cm$^2$. Thus, the density of 500 to 520 mAh/cm$^3$ of the active material in the electrode is obtained.

In the case where a similar foamed resin is plated with nickel on both sides thereof at the current density of 1.0 A/cm$^2$ while sufficiently agitating and the resulting sponge-like nickel porous metal matrix having a uniform sectional area of gratings is used as a plaque which is filled with a similar paste mainly comprising a hydroxide nickel powder and subjected to a pressure of 400 kg/cm$^2$, on the other hand, the density of the filled active material of the electrode is 430 to 450 mAh/cm$^3$.

Before pressure work, the density in the latter case is 300 to 320 mAh/cm$^3$ which compares to the density of 350 to 380 mAh/cm$^3$ in the former case. This shows that more active materials are used with the plaque in the former case than in the latter case. It has also been found that the sectional area of the gratings at the central part of the resin sponge relative to the sectional area of the gratings near the surface thereof tends to decrease with the increase in current density or with the decrease in agitation for palting or with the increase in the thickness of the resin sponge.

SUMMARY OF THE INVENTION

An object of the present invention is to provide a battery electrode comprising a plaque of a sponge-like porous metal matrix high in the density of an active material impregnated in the plaque and which is produced at a low cost.

According to the present invention, there is provided a battery electrode comprising a plaque made of a sponge-like porous metal matrix having a multiplicity of cells connected with each other three-dimensionally, wherein the sectional area of the gratings making up the sponge-like metal porous plaque decreases continuously along the thickness of the plaque from the surface thereof toward the central part thereof and an active material is impregnated in the porous plaque, wherein most of the multiplicity of cells within the sponge-like porous metal matrix have a unidirectional spindle shape having longer and shorter diameters, and the electrode is spiralled in the direction along the shorter diameter of the substantially spindle-shaped cells in the porous plaque.

DESCRIPTION OF THE PREFERRED EMBODIMENTS

Figure 1:
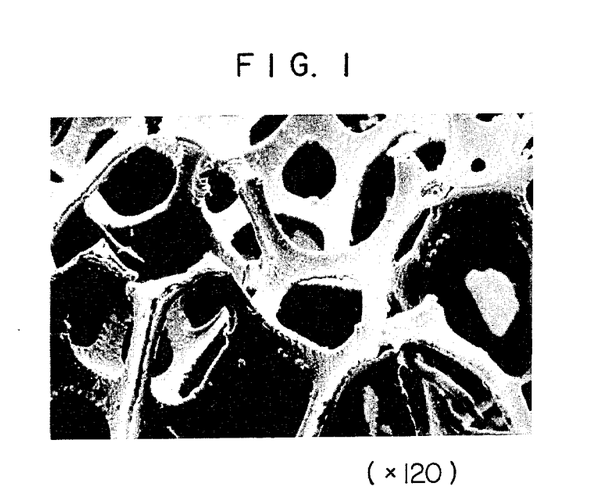
FIG. 1 is a micrograph of a sponge-like nickel porous metal matrix representing an example of a porous metal used with a battery electrode according to the present invention, in which nickel forms gratings (with a sectional area of about 2000 $\mu$m$^2$) defining spherical cells.
Figure 3:
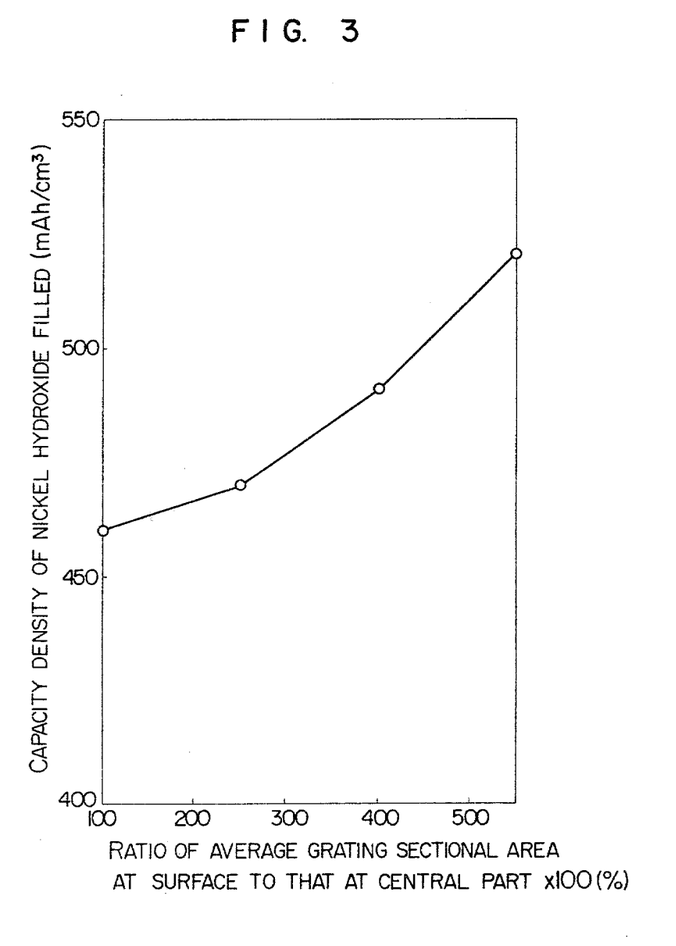
FIG. 3 shows the relation between the ratio of the grating sectional area near the surface to the grating sectional area near the central part and the density of a hydroxide nickel active material which is obtained from the hydroxide nickel powder (of the composition the first embodiment described later) filled and pressurized at 400 kg/cm$^2$.

A micrograph of a sponge-like porous metal matrix ($\times$100) having spherical cells 450 to 550 $\mu$m in diameter and defined by gratings is shown in FIG. 1. The graph of FIG. 3 shows the relation between the change in the ratio of the grating sectional area at the central part to the grating sectional area near the surface along the thickness of a sponge-like nickel porous plate matrix having an average porosity of 95% and the density to which a powder mixture mainly composed of hydroxide nickel powder (86% by weight) is impregnated in the electrode and pressurized up to 400 kg/cm$^2$. This shows that the density of the impregnated material is increased with the increase in the ratio of the grating sectional near the surface to the grating sectional area at the central part multiplied by 100. If the value of the ratio multiplied by 100 exceeds 500, however, the strength of the gratings at the central part becomes insufficient so that the plaque is liable to be separated into upper and lower parts, thus reducing the electrode strength to an insufficiently low level. This problem is posed for the average porosity higher than about 93%. below which such a problem of a reduced strength is not encountered, in which case, however, the density of the impregnated active material is reduced with the porosity, thereby eliminating the advantage of a high density of the impregnated active material. For this reason, the above-mentioned ratio is desirably 500% or lower. In a conventional method, electrodes having plaques of different porosities or the like are overlaid one on the other and an active material is impregnated in them at high density. According to the present invention, by contrast, the electrode is such that the diameter of the gratings making up a plaque changes continuously so that an active material is impregnated in this integral plaque with a higher porosity inside thereof. This offers a long-life cycle to charge and discharge on the one hand and the high strength of the grating along the longer side contributes to a higher ability to hold the active material on the other hand.

Figure 4:
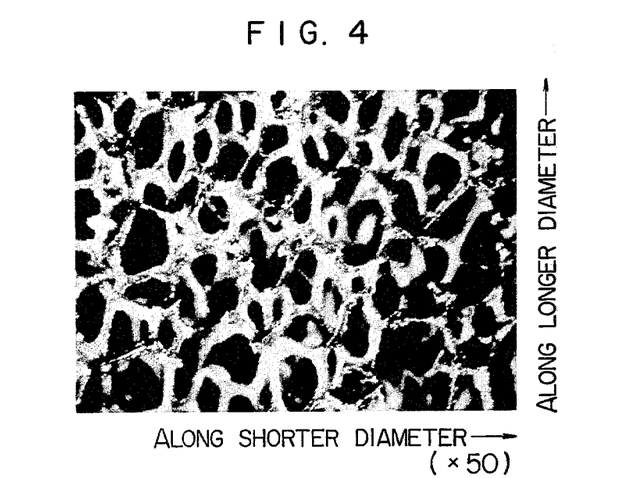
FIG. 4 is a micrograph showing an example of a nickel plaque made of a sponge-like porous metal matrix having substantially spindle-shaped cells mostly unidirectional and defined by the nickel gratings making up the plaque, the abscissa and ordinate representing short and long sides respectively.
Figure 5:
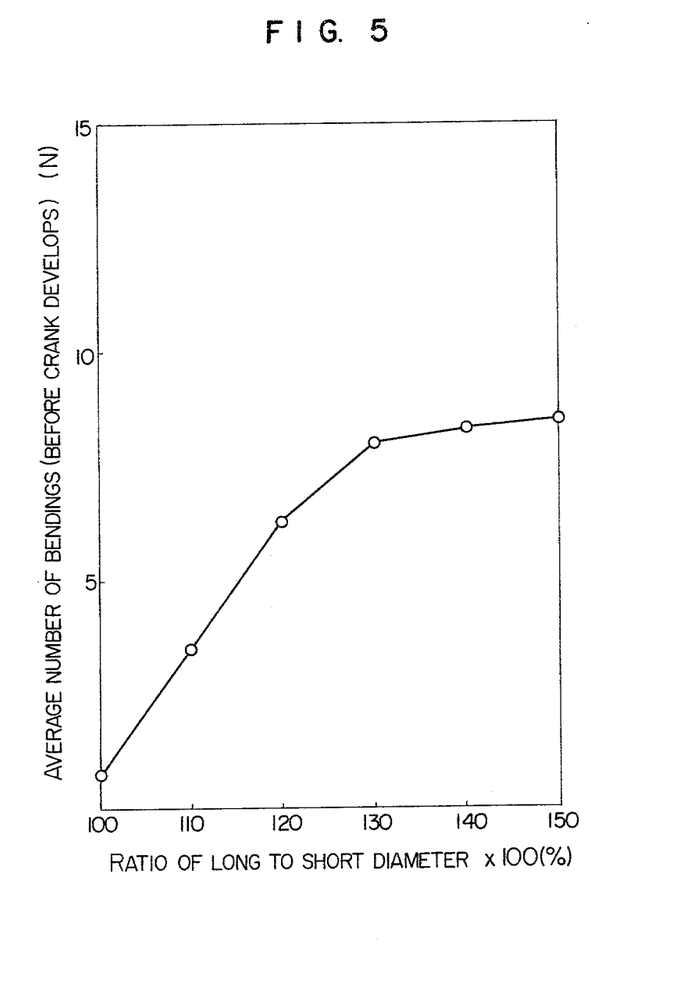
FIG. 5 shows the relation between the ratio of the longer diameter to the shorter diameter and the number of times of bending causing a crack along the shorter diameter of an electrode having a plaque of FIG. 4 impregnated with an active material, the electrode being held between rollers 100 mm in diameter and bent by 90 degrees in two directions, alternatively.

In a conventional case of a spiral electrode having a plaque of this sponge-like nickel porous material matrix, a crack develops at the time of spiralling even in an electrode 1 mm thick if a mixture of active materials composed as mentioned above is filled to a density as high as 520 mAh/cm$^2$. In an extreme case, the plaque is broken thus deteriorating the electrode electrical performances. Therefore, if such an electrode is to be used effectively in that form, the density of the impregnated active material must be reduced to lower than 430 mAh/cm$^3$ in the case of an electrode 1 mm thick. This results in the shortcoming of the inability to fill the active material at high density. It has been found out, however, that substantially no crack develops if the multiplicity of cells, that is, the spherical spaces continuously overlapped as seen in FIG. 1 in the sponge-like nickel porous metal matrix are deformed so that most of the cells may become spindle-shaped having a directivity and an active material is filled up to about 520 mAh/cm$^3$ in density with the electrode spiralled along the shorter side of the spindle-shaped cells. If the electrode is spiralled along the longer side, by contrast, a multiplicity of cracks tend to develop, especially, on the case of the deformed cells as compared with the spherical spaces. In order to determine the liability to develop a crack at the time of spiralling, a test was conducted in which an electrode 100 mm wide, 200 mm long and 1 mm thick filled with about 520 mAh/cm$^3$ of the nickel hydroxide of the above-mentioned composition and held between two cylinders 100 mm in diameter was bent repeatedly in longitudinal directions at the angle of 90 degrees respectively. The relation between the average value of the ratio of the longer diameter to the shorter diameter multiplied by 100 of the substantially spindle-shaped cells within the plaque and the number of times of bendings (each involving the bending to both directions at 90 degrees) before a crack develops is shown in FIG. 5. The result of this test shows that a crack is more difficult to develop with the increase in the ratio between the longer diameter and the shorter diameter. The sponge-like porous metal matrix having the substantially spindle-shaped cells within it was made by plating a resin sponge while extending or pulling it in one direction. For the average value of 150% or higher in the ratio of the longer diameter to the shorter diameter multiplied by 100, the carbon black layer coated on the resin sponge develops a crack and fails to be plated at the cracked portion, and the gratings sometimes are broken at the time of roasting the resin, resulting in a weak plaque. A micrograph ($\times 100$) of a sponge-like nickel porous metal matrix having substantially spindle-shaped cells is shown in FIG. 4. In this way, in the case of an electrode using a plaque of a sponge-like nickel porous material matrix having substantially spindle-shaped cells may take a spiral form with an active material impregnated to the extent of high density, thus making possible a high capacity of a battery having spiral electrodes. This is also applicable to the primary battery having a spiralled enlarged electrode area to attain high-rate discharge electrical performances as required. This embodiment is of course also applicable with equal effect to a spiral electrode of a lead acid battery.

This sponge-like porous metal matrix having substantially spindle-shaped cells is easily produced continuously. Specifically, in view of the fact that about the only requirement is to pull the resin sponge while it is being plated, a long strip of plaque is produced by a simple process. In this case, the long strip should preferably be pulled in a longitudinal direction.

The reason for an improved density of the active material impregnated in the sponge-like porous metal matrix of the electrode having the porous plaque of which the sectional area of the gratings is reduced along the thickness therewithin for an increased porosity appears to be that the greater porosity in the plaque allows more active material to be impregnated more easily and that the impregnated active material is unlikely to come off. The reason for which no crack develops when the active material is spiralled along the shorter diameter of the substantially spindle-shaped cells in the sponge like porous metal matrix appears to be that the gratings making up the plaque still have a margin of extension under the force exerted toward the outer periphery at the time of spiralling. (Of course, there is exerted a compressive force toward the inner periphery, but the force of extension toward the outer periphery provides a main external force in the case where a sufficient amount of active material or the like is impregnated in the porous metal.) If the active material is spiralled along the longer diameter, by contrast, a crack is more liable to develop than when spherical cells are formed. In the case of a sponge-like porous metal matrix having spherical cells therewithin (95% in porosity and having 55 cells per inch), a crack is hard to develop when the density of the impregnated active material is reduced from 520 mAh/cm$^3$ to 460 mAh/cm$^3$. Even though the inventors suspected that the lack of annealing of the sponge-like porous nickel may be another cause of a crack, it has been found that the condition remains unchanged even if the annealing temperature is increased from 800° C. to 1000° C. or the annealing time is lengthened from 30 minutes to one hour.

First embodiment:

A foamed urethane resin plate (1.8 mm thick and having 55 cells per inch) is immersed in a colloidal fluid dispersion of carbon black thereby to coat the surface of the resin with the carbon black. The resulting structure is plated with nickel from both sides thereof in an ordinary Watt solution for 5 minutes at the current density of 3 A/cm² without agitation. The structure thus plated is washed in water and roasted in the air at 500° C. for 30 minutes. After removing the resin in this way, the structure is annealed in a hydrogen environment by being heated at 800° C. for 30 minutes, thus producing a sponge-like porous nickel 96% in average porosity, having 55 cells per inch, about 2800 μm² in the sectional area of the surface gratings and about 700 μm² in the sectional area of the central gratings. This is subjected to pressure between rollers to obtain a plaque about 1.45 mm thick and 95% in average porosity.

This plaque is filled with a paste-like mixture of 87% by weight of hydroxide nickel powder (most of which have a grain size of 25 to 150 μm on the average), 10% by weight of nickel powder (2 to 6 μm in average grain size), cobalt powder (2 to 6 μm in average grain size) and 0.3% by weight of aqueous solution of carboxymethyl cellulose. The resulting structure is dried, immersed in a fluorine resin suspension (containing 1% by weight of resin), dried again and pressurized at 400 kg/cm² between flat plates, thus producing an electrode.

Second embodiment:

Except that the desired position of the sponge-like porous nickel plaque is subjected to pressure of 500 kg/cm² before being impregnated with an active material, the same procedures as in the first embodiment are followed. Then, an electrode lead is welded to the pressurized position.

Third embodiment:

Except that a foamed urethane resin is plated under the tensile strength of 2 kg/cm² in one direction, the same procedures as in the first embodiment are taken to produce an electrode.

Forth embodiment:

The electrode obtained in the third embodiment above is spiralled in the direction of the shorter diameter of the substantially spindle-shaped cells of the plaque with a conventional cadmium electrode and a polyamide non-fabric separator, thus making spiral electrodes. This step is followed by ordinary steps, thus producing a cylindrical enclosed nickel-cadmium storage battery. Although the present invention is applied only to the nickel electrode in this embodiment, it may be applied with equal effect also to the cadmium electrode, so that the same meritorious effect is obtained in a battery using both positive and negative electrodes according to the present invention. In the embodiment under consideration, the sponge-like porous metal matrix is used for the nickel electrode. If the metal plaque of the sponge-like porous material matrix is changed, the present invention is applicable widely to the electrodes of the secondary battery or the primary battery requiring a high rate discharge performance either in plate or spiral form.

Figure 6:
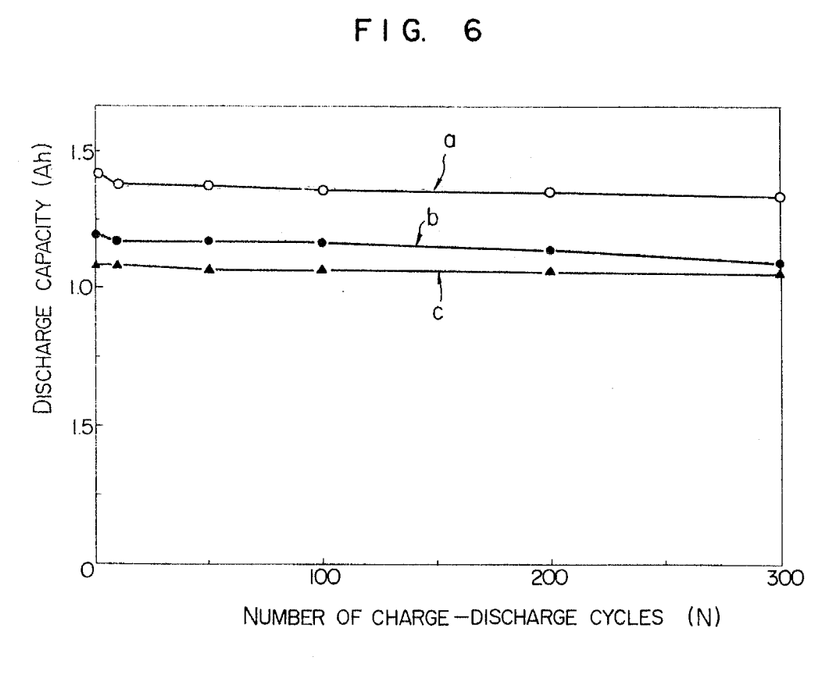
FIG. 6 is a graph showing the relation between the number of times of charge-discharges and the discharge capacity of a half cell having an electrode according to the first embodiment of the present invention, in which (a) shows the case using an electrode measuring 60 mm by 50 mm by 1 mm, an opposite electrode of a nickel screen and an electrolyte of 30% KOH aqueous solution, (b) shows the case using an electrode of a sponge-like nickel porous metal matrix having the same sectional area of gratings at the central part and near the surface, and (c) shows the case using a conventional sintered nickel positive electrode.

The result of studying the service life cycle of the nickel electrode of the secondary battery providing an example of application of the present invention with reference to a half cell is shown in FIG. 6. The electrode measures 50 mm by 60 mm by 1 mm and is the same as that made in the first embodiment above. A nickel screen is used as an opposite electrode and a 25% by weight of KOH aqueous solution as an electrolyte. The charging is effected at 200 mA for 10 hours at 20° C. and the discharging at 1000 mA at the same temperature to the till of the voltage of 150 mV vs Hg/Hgo 25% by weight of KOH, as the result thereof is shown in (a) of the same drawing. For comparison, the curve (b) shows the charge-discharge characteristics of an electrode of the same size having a sponge-like porous nickel metal with the gratings substantially the same in sectional area which has been processed in similar fashion to the first embodiment. For further comparison, the characteristics of a conventional sintered positive electrode of the same size are shown by the curve (c). In all the curves (a), (b) and (c), an average figure for five half cells is indicated. This graph shows that the nickel electrode according to the present invention has a discharge capacity higher by 20 to 25% than the conventional sintered nickel electrode (c) while the service life cycle is the same for both the electrodes. On the other hand, the electrode according to the invention is about 15% higher in discharge capacity than the electrode of (b) and superior in service life cycle. This is also the case with the electrode of the third embodiment.

Figure 7:
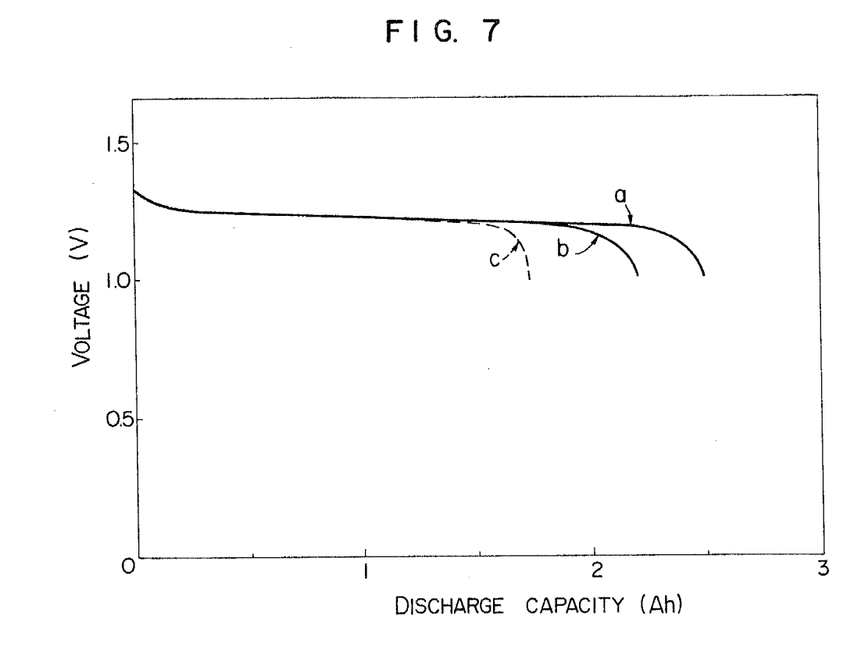
FIG. 7 is a graph showing the relation between voltage and discharge capacity in which the discharge curve a represents discharge at 1650 mA of a cylindrical enclosed nickel-cadmium storage battery (C-type) comprising a 30 weight % KOH aqueous solution of 6.5 cc, a separator and a conventional cadmium electrode according to the third or fourth embodiment of the present invention describe later, the discharge curve b represents the case using a spiral nickel positive electrode according to the first embodiment in which pressure application is reduced for a lower density of 430 mAh/cc, and the discharge curve c represents the case of a conventional battery.

The curve (a) in FIG. 7 shows the discharge characteristics of an electrode of the third embodiment in which the plating time on the resin sponge is shortened, thus producing a sponge-like porous nickel 2 mm thick and 97.5% in porosity, and the resulting plaque structure is pressed between rollers to the thickness of about 1 mm, the particular electrode being used with a cylindrical enclosed nickel-cadmium storage battery of C-type made by the same processes as in the fourth embodiment and discharged at 1650 mA after being charged at 200 mA for 20 hours at 20° C. The nickel positive electrode used measures 38 mm by 210 mm by 0.68 mm, and the cadmium negative electrode measures 39 mm by 260 mm by 0.55 mm. In test production of this storage battery, the nickel positive electrode is not charged, while the cadmium negative electrode is charged at about 500 mAh, the remaining theoretical capacity being about 4000 mAh.

As a comparison, the curve (b) represents the electrical performances of a battery using a nickel positive electrode of the same size as (a) and 430 mAh/cm³ in the density of the impregnated active material according to the first embodiment. Also, the curve (c) represents the performances of a battery using a conventional sintered nickel positive electrode of the same size. It will be seen that the nickel electrode according to the present invention is higher in capacity than the conventional sintered nickel positive electrode while the voltages are substantially equal to each other.

We claim:

1. In a battery electrode having a plaque of a sponge-like porous metal matrix having a multiplicity of cells therein connected with each other three-dimensionally, the improvement wherein the sectional area of the gratings making up said sponge-like porous metal plaque is reduced continuously along the thickness of said plaque from the surface to the central part thereof and an active material is impregnated in said porous plaque.

2. A battery electrode according to claim 1, wherein the sectional area of the gratings near the surface of said sponge-like porous metal matrix is larger than 100% of the average value of the sectional area of the gratings at the central part and 500% in maximum.

3. A battery electrode according to claim 1, wherein said sponge-like porous metal matrix is a long strip in form, said porous metal matrix being impregnated with an active material, followed by molding under pressure and cutting to the desired size.

4. A battery electrode according to claim 1, wherein most of the multiplicity of spaces within said sponge-like porous metal matrix have unidirectional spindle shape having longer and shorter diameters.

5. A battery electrode according to claim 4, wherein the longer diameter is not more than 150% of the average value of the shorter diameter.

6. A battery electrode according to claim 4, wherein said sponge-like porous metal matrix has a shape of a long strip and is impregnated with an active material, followed by the steps of molding under pressure and cutting to the desired size.

7. A battery electrode according to claim 4, wherein said electrode is spiralled in the direction along the shorter diameter of said substantially spindle-shaped cells in said porous plaque.

* * * * *